United States Patent
Abbett et al.

(10) Patent No.: US 8,054,215 B2
(45) Date of Patent: Nov. 8, 2011

(54) PRECISION REGISTRATION FOR RADAR

(75) Inventors: Michael R. Abbett, Montgomery Village, MD (US); Sergio Torres, Bethesda, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 415 days.

(21) Appl. No.: 12/277,234

(22) Filed: Nov. 24, 2008

(65) Prior Publication Data

US 2009/0167591 A1 Jul. 2, 2009

Related U.S. Application Data

(60) Provisional application No. 60/991,588, filed on Nov. 30, 2007.

(51) Int. Cl.
*G01S 13/00* (2006.01)
(52) U.S. Cl. .............................. 342/37; 342/36; 342/38
(58) Field of Classification Search .............. 342/36–38, 342/165, 173, 174
See application file for complete search history.

(56) References Cited

U.S. PATENT DOCUMENTS

| | | | | |
|---|---|---|---|---|
| 4,232,313 A * | 11/1980 | Fleishman | ........................ | 342/36 |
| 5,138,321 A * | 8/1992 | Hammer | ........................ | 342/36 |
| 5,381,140 A * | 1/1995 | Kuroda et al. | ................. | 340/961 |
| 6,225,942 B1 * | 5/2001 | Alon | ............................... | 342/59 |
| 6,356,229 B1 * | 3/2002 | Schneider | ...................... | 342/70 |
| 6,359,586 B1 * | 3/2002 | Sviestins | ........................ | 342/451 |
| 6,381,538 B1 * | 4/2002 | Robinson et al. | .............. | 701/211 |
| 6,441,773 B1 * | 8/2002 | Kelly et al. | ................. | 342/26 R |
| 6,448,922 B1 * | 9/2002 | Kelly | ........................... | 342/26 R |
| 6,463,366 B2 * | 10/2002 | Kinashi et al. | .................. | 701/13 |
| 6,501,392 B2 * | 12/2002 | Gremmert et al. | ............. | 340/971 |
| 6,542,810 B2 * | 4/2003 | Lai | ................................ | 701/120 |
| 6,567,037 B1 * | 5/2003 | Fung et al. | ..................... | 342/29 |
| 6,573,858 B1 * | 6/2003 | Fung et al. | ..................... | 342/36 |
| 6,810,322 B2 * | 10/2004 | Lai | ................................ | 701/120 |
| 6,828,922 B1 * | 12/2004 | Gremmert et al. | ............. | 340/949 |
| 6,885,340 B2 * | 4/2005 | Smith et al. | .................... | 342/465 |
| 6,917,860 B1 * | 7/2005 | Robinson et al. | ................. | 701/3 |
| 6,967,616 B2 * | 11/2005 | Etnyre | .......................... | 342/182 |
| 7,027,898 B1 * | 4/2006 | Leger et al. | ....................... | 701/14 |
| 7,081,834 B2 * | 7/2006 | Ruokangas et al. | .......... | 340/945 |
| 7,123,192 B2 * | 10/2006 | Smith et al. | .................... | 342/455 |
| 7,242,460 B2 * | 7/2007 | Hsu et al. | ...................... | 356/4.01 |
| 7,248,206 B1 * | 7/2007 | Boka et al. | ....................... | 342/90 |
| 7,358,892 B2 * | 4/2008 | Thome et al. | ................... | 342/174 |
| 7,383,131 B1 * | 6/2008 | Wey et al. | ........................ | 702/4 |
| 7,420,501 B2 * | 9/2008 | Perl | ................................. | 342/30 |
| 7,429,950 B2 * | 9/2008 | Smith et al. | .................... | 342/456 |
| 7,471,995 B1 * | 12/2008 | Robinson | ........................... | 701/3 |

(Continued)

*Primary Examiner* — Thomas Tarcza
*Assistant Examiner* — Peter Bythrow
(74) *Attorney, Agent, or Firm* — Marsh Fischmann & Breyfogle LLP

(57) ABSTRACT

A precision radar registration ($PR^2$) system and method that employs highly accurate geo-referenced positional data as a basis for correcting registration bias present in radar data. In one embodiment, the $PR^2$ method includes sample collection and bias computation function processes. The sample collection process includes ADS-B sample collection, radar sample collection, and time alignment sub-processes. The bias computation function process includes bias computation, quality monitoring and non-linear effects monitoring sub-processes. The bias computation sub-process results in a bias correction solution including range bias $b_\rho$, azimuth bias $b_\theta$, and time bias $b_T$ parameters. The quality monitoring sub-process results in an estimate of solution quality. The non-linear effects monitoring sub-process results in detection of the presence of non-linear bias, if any, in the bias correction solution.

22 Claims, 4 Drawing Sheets

U.S. PATENT DOCUMENTS

| | | | |
|---|---|---|---|
| 7,515,087 B1* | 4/2009 | Woodell et al. | 342/26 B |
| 7,605,747 B1* | 10/2009 | Mookerjee et al. | 342/90 |
| 7,616,149 B2* | 11/2009 | Powers et al. | 342/36 |
| 7,868,811 B1* | 1/2011 | Woodell et al. | 342/26 B |
| 2002/0004697 A1* | 1/2002 | Lai | 701/120 |
| 2002/0039072 A1* | 4/2002 | Gremmert et al. | 340/945 |
| 2003/0016156 A1* | 1/2003 | Szeto et al. | 342/26 |
| 2005/0007272 A1* | 1/2005 | Smith et al. | 342/189 |
| 2005/0068232 A1* | 3/2005 | Smith et al. | 342/465 |
| 2006/0030994 A1* | 2/2006 | Lai | 701/102 |
| 2006/0202886 A1* | 9/2006 | Mahapatra et al. | 342/176 |
| 2007/0069950 A1* | 3/2007 | Smith et al. | 342/456 |
| 2007/0115165 A1* | 5/2007 | Breen et al. | 342/29 |
| 2009/0167591 A1* | 7/2009 | Abbett et al. | 342/37 |
| 2009/0201191 A1* | 8/2009 | Kozhevnikov et al. | 342/32 |
| 2010/0156698 A1* | 6/2010 | Baud et al. | 342/36 |

* cited by examiner

PRECISION REGISTRATION FOR RADAR

RELATED APPLICATION INFORMATION

This application claims priority from U.S. Provisional Application Ser. No. 60/991,588, entitled "PRECISION REGISTRATION FOR RADAR" filed on Nov. 30, 2007, which is incorporated by reference herein in its entirety.

GOVERNMENT INTERESTS

This invention was made with Government support under Contract No. DTFA01-03-C-00015 awarded by the Federal Aviation Administration. The Government has certain rights in this invention.

FIELD OF THE INVENTION

The present invention relates generally to the tracking of target by radar, and more particularly to correcting registration bias present in radar data.

BACKGROUND OF THE INVENTION

The raw data provided by radar (a measurement of range and azimuth in the radar coordinate system) is subject to random noise and systematic errors (aka registration errors). Before radar targets can be used by the tracking and display functions of Air Traffic Control (ATC) systems, registration errors must be removed with as much accuracy as possible. In multi-sensor environments failure to align the reference frames could result in unphysical track discontinuities and degraded surveillance accuracy to levels even lower than any single sensor. Legacy systems utilize methodologies to address registration errors between radars such that corrected reports from multiple radars each report an aircraft to be at the same position. The introduction of ADS-B (Automatic Dependent Surveillance—Broadcast) gives rise to a need to register ADS-B target positions with radar positions in order to support safe separation of ADS-B equipped aircraft from non ADS-B equipped aircraft. In addition, ADS-B opens the possibility for significant accuracy improvements in the determination of registration parameters.

Air traffic controllers maintain aircraft safely separated with the help of targets rendered on a situation display as well as other tools. In a multi-sensor environment (e.g., combining various radars and ADS-B) the positional data displayed to the controller will show path discontinuities when there are residual registration correction errors. Inaccuracies in registration correction will also have a detrimental impact in the accuracy of the tracker and subsequently in the functions that depend on tracker outputs (such as the tactical conflict alert function).

The legacy solution to the registration bias problem was developed based on a radar-pair system. Targets from aircraft flying in a region where the coverage of two radars overlaps (at least partially) are time-aligned and the distance between them computed. After collecting a large sample of such targets the random component in the computed distance is reduced (tends to cancel out or reach negligible levels for sufficiently large samples); the remaining value is an indication of uncorrected bias (azimuth and range separately). All of these algorithms are related to the Maximum Likelihood (ML) problem (i.e. obtain the best 'model' parameters possible given the observed data, where the 'model' here is a simple additive bias to the azimuth and the range). Depending on the level of sophistication, these algorithms are formulated in terms of a Least Squares (LS) problem (only variances are used), or a Generalized Least Squares (GLS) problem (full covariance matrix is used).

However, registration correction algorithms that work with radar-pairs are not readily usable with ADS-B surveillance sources. Leaving data format incompatibilities aside, possible extensions of the two-radar algorithms to use ADS-B sources by treating the ADS-B as data of better quality fail in two respects: a) most of the algorithms do not support sensors with large differences in accuracy and, most importantly, b) even if they incorporated weights to the measurements based on sensor accuracy, in a multi-sensor environment the registration solutions can potentially be unstable exhibiting oscillations ('ringing') when a $3^{rd}$ sensor is introduced. To exemplify: when the sensor pair A-B is used the registration solution for B is 'high', but when the algorithm is run for the pair B-C the solution for B becomes 'low'. An unstable, oscillating solution is observed when alternating between A and C to find registration corrections for B.

A commonly used algorithm in major ATC systems (HCS, ERAM, etc) is the 2-radar 4-equation method (R2E4 legacy registration), which is a Least Squares minimization of the distance between pairs of reports coming from two radars and using a large collection of time aligned common targets. These algorithms rely on collecting two separate samples of targets from two regions located to each side of the line joining the radar centers. The need to have two independent samples collected in these two separate regions is dictated by the choice of LS problem that couples the equations containing the 4 registration parameters (range and azimuth for two radars). In addition to the two problems described above, the R2E4 introduces the additional burden of the need to have separate collections in two regions, which could limit (or exclude altogether) its usability in areas of low traffic. Another drawback of the legacy registration algorithm is the need for a single-sensor tracker implemented within the registration function that provides accurate time extrapolated positions to allow for time-coincident comparisons of target positions. To improve accuracy of the time alignment of targets, in some implementations a maneuver detector filters out maneuvering targets (adding algorithm complexity).

SUMMARY OF THE INVENTION

Accordingly, the present invention provides a precision radar registration ($PR^2$) algorithm that employs highly accurate geo-referenced positional data as a basis for correcting registration bias present in radar data. In one embodiment, the geo-referenced positional data may be ADS-B data, although, in other embodiments, the geo-referenced positional data may be from other sources in lieu of or in addition to ADS-B systems.

The $PR^2$ algorithm may be implemented in, for example, ATC systems, air surveillance radar networks with ADS-B equipped aircraft traffic, defense systems, and command and control systems. The legacy approach to registration may be retained in an integrated implementation, however the proposed algorithm does not depend on a tracker to provide a velocity. Instead, target histories are retained and time alignment is achieved by interpolation between closely spaced ADS-B target histories. Smoothed velocities, used for target selection, are derived from target histories. This approach reduces complexity and eliminates prediction errors (such as tracker lag) that are possible when using tracker produced velocity and is a key element that makes this registration approach independent from the ATC tracking function. That independence makes it possible to perform registration analysis on radars that are in a maintenance configuration that provides target reports as inputs to the system but are not made available to the tracking function.

The present invention recognizes that uncorrected registration bias parameters can be derived with significantly higher accuracy when ADS-B data is available rather than just radar data; this is due to the intrinsic higher accuracy of the ADS-B data, which is based on GPS. The algorithm presented here uses ADS-B surveillance data as a positional reference to derive range, azimuth and time bias parameters using targets associated with ADS-B equipped aircraft that are simultaneously observed by radar. The registration correction algorithm also includes the derivation of registration correction parameters for radars not visited by ADS-B traffic but that partially overlap radars that do have ADS-B traffic within their coverage. Another situation where the $PR^2$ algorithm provides registration correction parameters is when a radar has only partial coverage of ADS-B traffic. In this case $PR^2$ finds registration solutions as long as there are sufficient numbers of targets that pass the data collection criteria.

The $PR^2$ algorithm utilizes ADS-B data as an accurate positional reference against which radar targets can be compared. The algorithm makes use of the Linear Regression Analysis (LRA) between the range and azimuth measurement differences and respective velocities. For situations where time bias is absent the LRA formalism reduces to the Least Squares (LS) approach that compares measurements (targets) with the trusted reference (ADS-B) and minimizes the difference. To achieve enhanced results from the $PR^2$ algorithm, it may be desirable for a sufficiently large sample of targets from a single radar and from ADS-B equipped aircraft to be collected, although it may be possible to achieve acceptable results with a smaller number of samples. For each radar, a single radar optimization is performed to obtain its corresponding range, azimuth and time bias parameters. The part of the algorithm that extracts the registration correction parameters can be extended to radars for which it is not possible to collect a sample of targets from ADS-B aircraft but that overlap with radars that do have ADS-B traffic. This is achieved by reusing the algorithm, this time using the 'ADS-B-calibrated' radar as the trusted source that serves as an accurate positional reference. This mechanism in effect transfers the positional accuracy of the ADS-B-calibrated radar to a second radar not in contact with ADS-B traffic. The availability of an 'absolute' reference removes the potential instability of solutions that could be obtained in current radar-pair algorithms. One advantage of the $PR^2$ algorithm as compared with legacy algorithms is that whereas the legacy algorithms work on radar pairs, providing a solution set for the 2 radars as a pair—with subsequent potential inconsistencies of solutions when one of the members of the pair is paired with a $3^{rd}$ overlapping radar, the $PR^2$ algorithm fixes the ADS-B source as a reference and only adjusts the three bias parameters for a single radar resulting in a more robust and stable solution. The algorithm also provides a metric that monitors the quality of the solution and thus aids in the identification of sources of registration bias not correctable by simple azimuth, range and time bias parameters. These errors can arise as a result of errors in the adapted site coordinates. The mechanism proposed here includes an extension that derives proposed corrections to the site coordinates. The $PR^2$ algorithm may be integrated with legacy registration algorithms which will operate in parallel and can provide backup capability during ADS-B rollout periods or periods of ADS-B coverage degradation or outage.

Various advantages and features of the $PR^2$ algorithm and systems employing the $PR^2$ algorithm include:

- The $PR^2$ algorithm improves on the widely used radar-pair sensor algorithms that use a Least-Squares approach by incorporating more accurate geo-referenced (e.g., ADS-B) positional data.
- The $PR^2$ algorithm is capable of detecting differences between the time reference used in ground and air systems (time bias).
- There is no need in the $PR^2$ algorithm to sample targets in two separate regions located on the two opposite sides of the separator line (line connecting the radar centers). An evaluation of the algorithm based on computer models shows that any set of points regardless of their location relative to the radar center will work.
- The $PR^2$ algorithm provides a 'figure of merit' to judge the goodness of the solution (see Quality Monitor Function).
- The $PR^2$ algorithm provides more stable solutions than the legacy algorithm by checking the statistical significance of the change in registration parameters against random fluctuations and by use of single sensor synching to an accurate geo-referenced source ('ringing' is removed)
- Under the registration correction model consisting of three statistically uncorrelated parameters (range, azimuth and time bias), implementations of the $PR^2$ algorithm are quite economical (the bias coefficients are the slope and intercept provided by the LRA ) representing savings in computational demands. With the LRA approach it is not necessary to solve the generalized LS problem which entails a numerically intensive iterative process whereas the LRA provides the three registration correction coefficients in a single pass.
- Unlike legacy algorithms that work in stereographic X,Y coordinates, the $PR^2$ algorithm works in the (native) radar coordinate system $(\rho,\theta)$ where the registration bias are not cross-correlated (covariance matrix is all zeros except for the diagonal). This fact results in a substantial reduction of computational demands and algorithmic complexity from an approach using a non-native coordinate system.
- The $PR^2$ Algorithm is not dependent on a secondary tracker nor a maneuver detector and can therefore be utilized to register radar sensors that are connected but offline and not actively participating in tracking operations.
- The sample collection period for the $PR^2$ algorithm is short for typical traffic loads (sufficient samples are collected in a few minutes).
- The $PR^2$ function is usable in situations where there is single radar coverage and it is desired to use ADS-B surveillance in the same area illuminated by the radar. The legacy radar pair solution does not apply in this situation.

Various refinements exist of the features noted in relation to the various aspects of the present invention. Further features may also be incorporated in the various aspects of the present invention. These refinements and additional features may exist individually or in any combination, and various features of the various aspects may be combined. These and other aspects and advantages of the present invention will be apparent upon review of the following Detailed Description and accompanying figures.

DESCRIPTION OF THE DRAWINGS

For a more complete understanding of the present invention and further advantages thereof, reference is now made to the following Detailed Description, taken in conjunction with the drawings, in which.

DETAILED DESCRIPTION

In one embodiment, the PR² algorithm includes the following steps:
1) Sample collection
2) Bias Computation Function
3) Radar to radar ADS-B-based correction propagation
4) Quality monitoring function, and
5) Generalized algorithm to detect and correct non-linear effects.

In other embodiments, the PR² algorithm may be implemented with a subset of the above five elements (e.g., where sufficient samples of targets are collected from ADS-B equipped aircraft for all radars being registered, the third element of radar to radar registration is not needed). Regardless of the number of elements implemented, FIG. 1 provides an overview of the functional flow process of the PR² algorithm 100.

Figure 1:
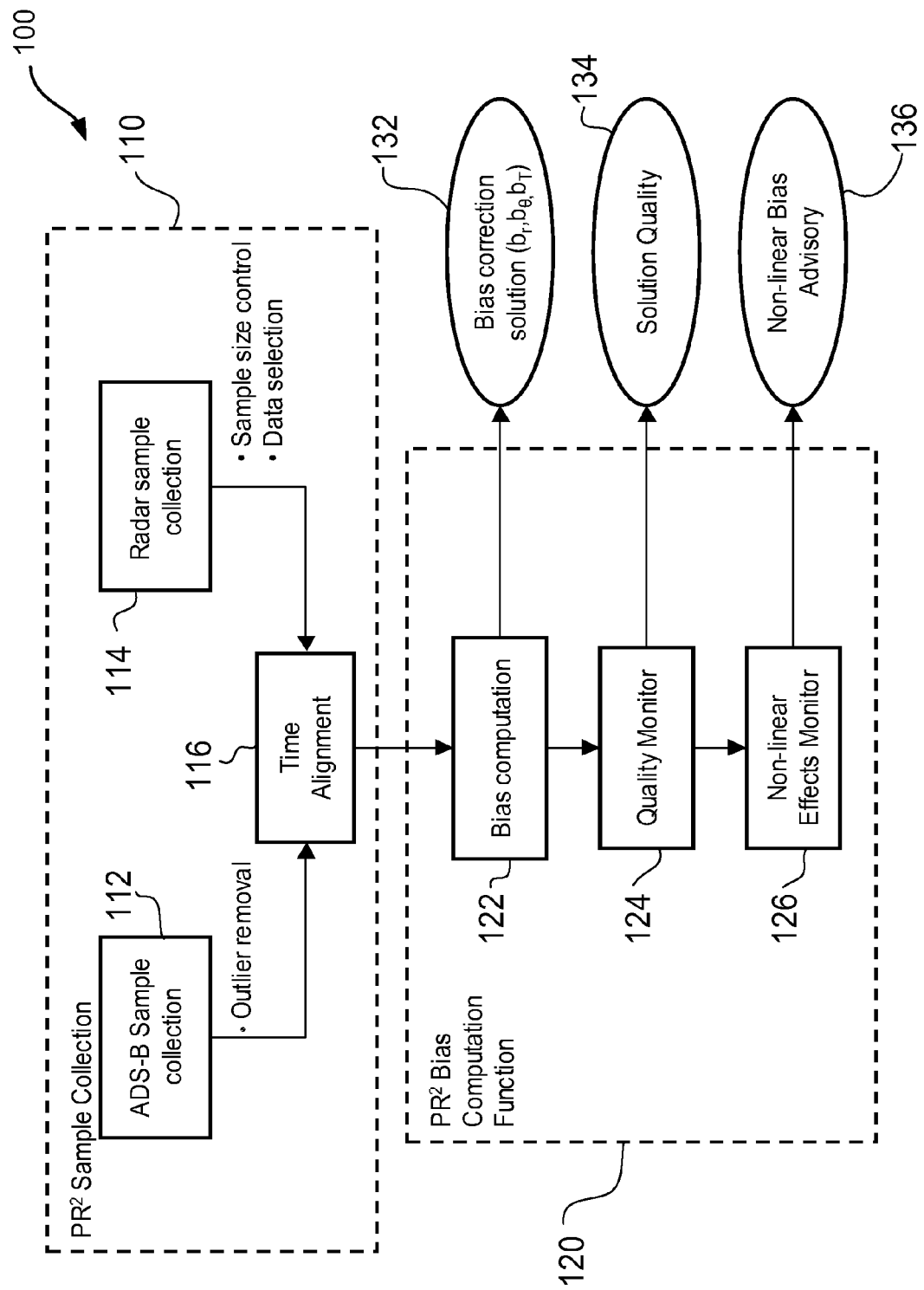
FIG. 1 illustrates the functional flow process of the PR² algorithm.

In FIG. 1, the PR² algorithm 100 is shown as including two main processes: a PR² sample collection 110 process and a PR² bias computation function 120 process. The PR² sample collection 110 process includes ADS-B sample collection 112, radar sample collection 114 and time alignment 116 sub-processes. The PR² bias computation function 120 process includes bias computation 122, quality monitoring 124 and non-linear effects monitoring 126 sub-processes. The bias computation 122 sub-process results in a bias correction solution 132 including range bias $b\rho$, azimuth bias $b_\theta$, and time bias $b_T$ parameters. The range bias $b_\rho$ and azimuth bias $b_\theta$ are examples of and may be referred to herein as the position bias parameters. The quality monitoring 124 sub-process results in an estimate of solution quality 134. The non-linear effects monitor 126 sub-process results in detection of the presence of non-linear bias 136, if any, in the bias correction solution 132. Various details of the foregoing elements of the PR² algorithm 100 are described below:

1) Sample Collection 110

The method for sample collection 110 is described below. Sample collections 110 includes both ADS-B sample collection 112 and radar sample collection 114. To achieve enhanced results it may be desirable that there be a statistically significant sample set. Preliminary analysis indicates that bias calculations can be performed with a sensitivity (1-sigma level) of 10 feet in range, 0.05 ACP (azimuth change pulse units=360°/4096) in azimuth and 16 milliseconds in time. These results were obtained using sample sizes of n=2000 targets that can be acquired in just below 3 minutes of operation under realistic traffic (this result applies for a modeled bias amplitude equal 3 times the noise and it is independent of where the targets fall inside the radar coverage area). Sensitivity decreases in proportion to $1/\sqrt{n}$ when the sample size n increases. The samples collected comprise a series of (uncorrected or previously corrected for registration) radar reports together with ADS-B reports from the same aircraft during the same time period. It is assumed there will be multiple ADS-B reports for each radar report however one sample is counted for one radar report. Selection of a sequence of reports from several aircraft in different parts of radar coverage is desirable. It is noted that given the typical traffic loads in ATC facilities a sample of few hundred targets can be collected in a relatively short time (for instance, with 70 active aircraft flying inside the radar coverage a sample of 400 targets can be collected in just over 1 minute, subject to traffic level.)

Collected targets are stored in containers that allow keyed access based on beacon code. When a total of <min sample_size> or more targets has been collected for a number of aircraft each of which has at least <min_targets_per_ac>, sample collection stops for this iteration of the algorithm (it is envisioned that the algorithm runs continuously although position and time bias parameters are obtained in a single pass). In this regard, <min_sample_size> and <min_targets_per_ac> are parameters that can be established prior to execution of the PR² algorithm 100. At the end of the collection period both the target data and the corresponding ADS-B data is made available in suitable keyed containers. Removal of outliers resulting for instance from duplicate or non-discrete beacon is handled by grouping targets from duplicate beacon codes based on a correlation algorithm (works assuming these two aircraft are not flying too close to each other) that excludes a target from one of the aircraft if the point-to-point distances and velocities exceed reasonable thresholds. Logic to deal with code duplication is essential, however to reduce exposure to error, it is advisable to limit sample collection to discrete codes. Use is made of the ICAO address available in ADS-B targets to ensure that ADS-B samples for one aircraft have the same ICAO address. Sample collection is transparent to beacon code changes in mid-air because such changes will be consistently reflected in both the radar and ADS-B sensors.

2) Bias Computation Function 120

In accordance with the bias computation sub-process 122, the LRA takes place separately for range and for azimuth. The LRA delivers the slope and intercept of correlation pairs ($\Delta\rho$, $\dot\rho$) and ($\Delta\theta$, $\dot\theta$) which constitute the sought bias coefficients (intercept=physical bias, slope=time bias). The linear relationship between the $\Delta\rho$ and $\dot\rho$ and between $\Delta\theta$ and $\dot\theta$ stem from the fact that performing a time translation (i.e. time bias) to the kinematic equations for $\rho(t)$ and $\theta(t)$ result in a linear relationship (to first order in time t) of the form $\Delta\rho=b_\rho+b_{T\rho}\dot\rho$ for range and $\Delta\theta=b_\theta+b_{T\theta}\dot\theta$ for azimuth, where $b_\rho$ is the physical range bias, $b_\theta$ is the physical azimuth bias, $b_{T\rho}$ is the time bias as seen in the range data, and $b_{T\theta}$ is the time bias as seen by the azimuth data. In this embodiment the smoothed velocities $\dot\rho$, $\dot\theta$ are computed with point to point central differences and the Sym-αβ filter. The Sym-αβ filter is convenient and performs well but it is not critical to the correct operation of the PR² algorithm. Other smoothing filters could work as well. The Sym-αβ is an acausal symmetric αβ filter (α and β refers to the weighting coefficients of the current measurement and the previous smooth estimate). Note that the algorithm operates after the sample has been collected, therefore at any given target time both the past and future path of the aircraft (as given by ADS-B) are known. The use of an acausal filter is therefore justified. This non real time mode of operation greatly simplifies the implementation because there is no dependency on a secondary tracker that provides predicted positions. Making use of known future positions (relative to the radar target time) makes the estimation of velocities and time aligned ADS-B positions simpler and more accurate. The algorithm described below incorporates some implementation choices that could admit variants in other embodiments of the algorithm. The important concept exposed by the PR$^2$ algorithm is that registration bias can be extracted in one pass and simultaneously for range, azimuth and time by performing a LRA on the data pairs $(\Delta\rho, \dot{\rho})$ and $(\Delta\theta, \dot{\theta})$. The LRA method below is a particular implementation that finds the slope and intercept of a linear trend by minimizing the difference between the data points and the corresponding ordinate of the linear trend evaluated at the same abscissa of the data point. There are other alternatives, such as minimizing the orthogonal distance between the data point and the linear trend. Numerical evaluations of the algorithm shows that there are no substantial performance gains for more complex implementations of the LRA analysis. Evaluation of the performance of the LRA analysis as implemented below and using realistic inputs show that it performs as well as more complex LRA implementations that explicitly incorporate the errors in the measurement of the velocities.

The processing steps and intermediate calculations required to obtain range, azimuth and time bias (the bias correction solution 132) using the PR$^2$ approach are described below. The steps refer to computation of regression coefficients for a single radar. The steps are repeated in identical fashion for all of the radars.

Data Inputs

| Data | Description |
| --- | --- |
| Target_ADSB | ADS-B targets |
| Target_Radar | Radar targets for the selected radar for registration computation |

Static Inputs

| Data | Description |
| --- | --- |
| Vel_Coeff | Velocity smoothing filter coefficients. Pre-computed based on algorithm parameter FILTER_ALFA |
| Radar_Adapt | Radar adaptation parameters necessary to transform the Lat/Lon of ADS-B target reports to the radar coordinate system: Radar location (latitude/longitude) Local earth's radius at the location of the radar Radar beta |
| Radar_Characteristics | Range quantization step Range noise standard deviation Azimuth quantization step Azimuth noise standard deviation |
| NACp table | Circular Probable Error (CPE) for each NACp level |

Outputs

| Data | Description | Units |
| --- | --- | --- |
| R_Bias | Range registration bias | nm |
| A_Bias | Azimuth registration bias | radians |
| T_Bias | Time bias | sec |
| Prob | Quality of solution: probability that the residuals are consistent with noise model | N/A |

Bias Computation Parameters

| Parameter | Description |
| --- | --- |
| ACC_TSTEP | Number of velocity points before and after the time when acceleration is computed. Specifically, the acceleration at time k (k is an index into a time-ordered array of velocities) is (v[k + n] − v[k − n])/(t[k + n] − t[k − n]), where v is the velocity array, t is the time array and n = ACC_TSTEP. Angular acceleration is computed using v = angular velocity, and range acceleration is computed using range velocity. |
| FILTER_ALFA | α parameter of the Sym-αβ filter for velocity. Measures the relative weight of the 'current' measurement (relative to the previous velocity estimate) and determines the strength of the filter. |
| AZI_VEL_HI | Value of angular velocity beyond which a target is counted as a "high angular velocity target". A counter of "high angular velocity targets" is incremented each time the computed angular velocity at the time of the radar target exceeds AZI_VEL_HI. This counter is used to determine when the algorithm converges to an acceptable solution. |
| MAX_ADS_DIST | Maximum horizontal distance [nm] separating the ADS-B target being processed from the previously processed ADS-B target for the same beacon code. If the computed distance between the current and previous targets (same beacon code) exceeds MAX_ADS_DIST, the ADS-B target is discarded. This is used to guard against beacon code duplicates |
| MAX_ALT_VEL | Maximum altitude change rate between two consecutive targets |
| MAX_AZI_ACC | Maximum angular acceleration. A radar target is discarded if the absolute value of the computed angular acceleration at the time of the target exceeds MAX_AZI_ACC |
| MAX_RHO_ACC | Maximum acceleration in the rho direction. A radar target is discarded if the absolute value of the computed radial acceleration component at the time of the target exceeds MAX_RHO_ACC |
| MIN_AZI_SIG | Minimum statistical significance below which an azimuth registration solution is accepted as an actual azimuth registration bias detection. It measures the amplitude of the computed registration bias in terms of standard deviations |
| MIN_NACP | Smallest NACp of ADS-B data accepted for processing (an ADS-B target with NACp smaller than MIN_NACP is discarded) |

-continued

| Parameter | Description |
|---|---|
| MIN_P | Minimum probability of solution. If the probability associated with the chi-squared of the solution is smaller than MIN_P then the solution is discarded. |
| MIN_RHO_SIG | Minimum statistical significance below which a range registration solution is accepted as an actual range registration bias detection. It measures the amplitude of the computed registration bias in terms of standard deviations |
| MIN_TGT | Minimum number of 'high velocity targets' (positive and negative in range and azimuth) required for the algorithm to converge. A registration bias solution is published only after a minimum of MIN_TGT 'high velocity targets' have been processed. |
| MIN_TIME_SIG | Minimum statistical significance below which a time registration solution is accepted as an actual time registration bias detection. It measures the amplitude of the computed registration bias in terms of standard deviations |
| N_ADS_BUFFER | Physical size of a memory buffer to store the most recent ADS-B reports (on a beacon code basis) in time order. (size depends on velocity filter) |
| RHO_VEL_HI | Value of radial velocity beyond which a target is counted as a "high radial velocity target". A counter of "high radial velocity targets" is incremented each time the computed radial velocity at the time of the radar target exceeds RHO_VEL_HI. This counter is used to determine when the algorithm converges to an acceptable solution. |
| VEL_TSTEP | Number of ADS-B target reports before and after the time when velocity is computed. |

Linear Regression Analysis
Prepare Static Data
1. Define the 'radar plane' parameters: a stereographic plane with point of tangency (POT) equal to the radar location on the ellipsoidal Earth and conformal radius equal to the local Earth radius at the radar location. The origin of this rectangular coordinate system is at the POT.
2. Compute the filter coefficients for the velocity smoothing Sym-αβ filter as follows:

$$c_{|k|} = \frac{\alpha(1-\alpha)^{|k|}}{S}, k: -M \ldots 0 \ldots M, S = \alpha + \sum_{i=1}^{M}(1-\alpha)^{|i|}$$

Where α is the FILTER_ALFA parameter (strength of smoothing), M is a truncation point.
For Each ADS-B Target
1. If the beacon code is not discrete, discard the target.
2. If the NACp<MIN_NACP, discard the target.
3. If the pressure altitude is invalid, discard the target.
4. Compute the vertical velocity using the current (z) and previous ADS-B pressure altitude ($z_p$) for the same aircraft:

$$\dot{z} = \frac{|z - zp|}{\Delta t}$$

5. If $\dot{z}$>MAX_ALTVEL, discard the target.
6. Transform the geodetic coordinates of the target to the radar native coordinate system ($\rho_A, \theta_A$), where ρ is slant-range and θ is azimuth. Use pressure altitude for conversion (pressure altitude is what is available in the radar reports). The Cartesian coordinates of the target on the radar plane ($X_A, Y_A$) are a byproduct of this transformation and are used ahead for additional computations.
7. Compute the estimated horizontal position of the aircraft on the radar plane at the time of this target by time interpolating the horizontal positions of the previous and next ADS-B targets (using the ADS-B target history in Cartesian coordinates on the radar plane).
8. Remove outliers: compute the horizontal distance on the radar plane of the target from the estimated target location (previous step). If this distance>MAX_ADS_DIST discard the target.
9. Store ADS-B target in a buffer of size N_ADS_BUFFER. There is one buffer for each discrete beacon code. Ensure that the 24-bit ICAO address of the target corresponds to the ICAO address of the aircraft whose target history is being updated.
For Each Radar Target
1. If the beacon code is not discrete, discard the target
2. If the pressure altitude is invalid, discard the target
3. Compute the vertical velocity using the current (z) and previous radar pressure altitude ($z_p$) for the same aircraft:

$$\dot{z} = \frac{|z - zp|}{\Delta t}$$

4. If $\dot{z}$>MAX_ALTVEL, discard the target
5. Compute the estimated horizontal position of the aircraft on the radar plane at the time of this target by time interpolating the horizontal positions of the previous and next targets.
6. Remove outliers: compute the horizontal distance on the radar plane between the target location and the estimated location (computed in the previous step). If this distance>MAX_ADS_DIST discard the target.
7. Compute the time interpolated (linear interpolation using adjacent points after and before the time of the radar target) $X_A$ and $Y_A$ coordinates of the aircraft position on the radar plane base on the ADS-B target history for this beacon code.
8. Convert $X_A, Y_A$ to the native radar coordinate system slant-range ($\rho_A$) and azimuth ($\theta_A$) using pressure altitude.

9. Compute the differences $\Delta\rho=(\rho_A-\rho_r)$ and $\Delta\theta=(\theta_A-\theta_r)$, where $(\rho_A, \theta_A)$ are the time interpolated ADS-B position in radar coordinates computed in the previous step; $(\rho_r, \theta_r)$ are the slant-range and azimuth of the radar target.

10. Compute the smoothed velocity components of the aircraft in the radar native coordinate system $(\dot\rho, \dot\theta)$ at the time of the radar target based on the stored ADS-B targets for this beacon code. Use the central difference method with d=VEL_TSTEP to obtain enough velocity points (2M+1) to apply the smoothing filter. Namely, individual velocity points (from which the smoothed velocity is derived) are $\dot\rho_k=(\rho_{k+d}-\rho_{k-d})/(t_{k+d}-t_{k-d})$ and $\dot\rho_k=(\theta_{k+d}-\theta_{k-d})/(t_{k+d}-t_{k-d})$; compute the point velocities for M points before the radar target time and M points after the radar target time; apply the Sym-$\alpha\beta$ smoothing filter to obtain the smoothed velocities:

$$\dot\rho_k(\text{smooth}) = \sum_{i=k-M}^{k+M} c_{|i|} \dot\rho_i$$

$$\dot\theta_k(\text{smooth}) = \sum_{i=k-M}^{k+M} c_{|i|} \dot\theta_i$$

11. Compute the acceleration components of the aircraft at the time of the radar target in the radar native coordinate system based on smoothed velocities computed in the previous step and using the central difference method with d=ACC_TSTEP:

$$\ddot\rho = \frac{\dot\rho_{k+d} - \dot\rho_{k-d}}{t_{k+d} - t_{k-d}}$$

$$\ddot\theta = \frac{\dot\theta_{k+d} - \dot\theta_{k-d}}{t_{k+d} - t_{k-d}}$$

12. If $\ddot\rho$>MAX_RHO_ACC then retain the target in the target history but skip further processing with this target (not included in the LRA).
13. If $\ddot\theta$>MAX_AZI_ACC then retain the target in the target history but skip further processing with this target (not included in the LRA).
14. Compute the standard deviations of the measured $\Delta\rho$ and $\Delta\theta$ as follows:

$$\sigma_{\Delta\rho} = \sqrt{\sigma_p^2 + \sigma_\rho^2 + Q_\rho^2/12}$$

and $$\sigma_{\Delta\theta} = \sqrt{\left(\frac{\sigma_p}{R_A}\right)^2 + \sigma_\theta^2 + Q_\theta^2/12},$$

where
$\sigma_p$ is the standard deviation of the ADS-B horizontal position error:
$\sigma_p$=CPE/2.44775, CPE=95% Circular Error Probable of ADS-B position based on NACp
$\sigma_\rho$ is the standard deviation of slant-range noise (radar specific)
$\sigma_\theta$ is the standard deviation of azimuth noise (radar specific)
$Q_\rho$ is the quantization step of slant-range (radar specific)
$Q_\theta$ is the quantization step of azimuth (radar specific)

$R_A$ is the [time interpolated] ground range based on ADS-B position $$R_A = \sqrt{X_A^2 + Y_A^2}$$

15. If $\dot\theta$>AZI_VEL_HI increase the N_AZI_HI_P counter by 1
16. If $\dot\theta$<-AZI_VEL_HI increase the N_AZI_HI_N counter by 1
17. If $\dot\rho$>RHO_VEL_HI increase the N_RHO_HI_P counter by 1
18. If $\dot\rho$<-RHO_VEL_HI increase the N_RHO_HI_N counter by 1
19. Store $\Delta\rho$, $\Delta\theta$, $\sigma_{\Delta\theta}$, $\sigma_{\Delta\rho}$, $\dot\rho$, $\dot\theta$ in separate arrays for each beacon code
20. Increase the total number of radar targets processed counter N by 1
21. If (N_AZI_HI_P$\geq$MIN_TGT) and (N_AZI_HI_N>MIN_TGT) and (N_RHO_HI_P>MIN_TGT) and (N_RHO_HI_N>MIN_TGT), compute a solution (the sums $\Sigma$ go from i=1 to N, where N is the total number of radar targets processed). To guard against an infinite loop force a solution when N>MAX_N:
    a. Compute $$S1_\rho = \sum \frac{1}{(\sigma_{\Delta\rho})_i^2}$$

b. Compute $$S2_\rho = \sum \frac{\dot\rho_i}{(\sigma_{\Delta\rho})_i^2}$$

c. Compute $$S4_\rho = \sum \frac{\Delta\rho_i}{(\sigma_{\Delta\rho})_i^2}$$

d. Compute $$S3_\rho = \sum d_i^2,$$

where $$d_i = \frac{1}{(\sigma_{\Delta\rho})_i}\left(\dot\rho_i - \frac{S2_\rho}{S1_\rho}\right)$$

e. Compute $\rho$-based time bias $$b_{T\rho} = \frac{1}{S3_\rho} \sum \frac{d_i \Delta\rho_i}{(\sigma_{\Delta\rho})_i}$$

f. Compute ρ bias $$b_\rho = \frac{S4_\rho - S2_\rho b_{T\rho}}{S1_\rho}$$

g. Compute standard deviation of ρ bias:

$$\sigma_{b\rho} = \sqrt{\frac{1}{S1_\rho}\left(1 + \frac{S2_\rho^2}{S1_\rho S3_\rho}\right)}$$

h. Compute standard deviation of ρ-based time bias:

$$\sigma_{bT\rho} = \sqrt{\frac{1}{S3_\rho}}$$

i. Compute goodness of fit for ρ:

$$\chi_\rho^2 = \sum \left(\frac{\Delta\rho_i - b_\rho - b_{T\rho}\rho_i}{(\sigma_{\Delta\rho})_i}\right)^2$$

j. Test for reasonableness:

If $Q\left(\frac{\chi_\rho^2}{2}, \frac{N-2}{2}\right) < \text{MIN\_P}$ discard the solution for ρ, Q is the incomplete gamma function If $\frac{\sigma_{b\rho}}{\sigma_{\Delta\rho}/\sqrt{N}} > \text{MAX\_SIGMA}$ discard the solution for ρ k. Test for significance:

If $\frac{b_\rho}{\sigma_{b\rho}} < \text{MIN\_RHO\_SIG}$ set $b_\rho = 0$ (no detection)

If $\frac{b_{T\rho}}{\sigma_{bT\rho}} < \text{MIN\_TIME\_SIG}$ set $b_{T\rho} = 0$ (no detection)

l. Compute $$S1_\theta = \sum \frac{1}{(\sigma_{\Delta\theta})_i^2}$$

m. Compute $$S2_\theta = \sum \frac{\dot\theta}{(\sigma_{\Delta\theta})_i^2}$$

n. Compute $$S4_\theta = \sum \frac{\Delta\theta_i}{(\sigma_{\Delta\theta})_i^2}$$

o. Compute $$S3_\theta = \sum d_i^2, \text{ where } d_i = \frac{1}{(\sigma_{\Delta\theta})_i}\left(\dot\theta_i - \frac{S2_\theta}{S1_\theta}\right)$$

p. Compute θ-based time bias $$b_{T\theta} = \frac{1}{S3_\theta}\sum \frac{d_i \Delta\theta_i}{(\sigma_{\Delta\theta})_i}$$

q. Compute θ bias $$b_\theta = \frac{S4_\theta - S2_\theta b_{T\theta}}{S1_\theta}$$

r. Compute standard deviation of θ bias:

$$\sigma_{b\theta} = \sqrt{\frac{1}{S1_\theta}\left(1 + \frac{S2_\theta^2}{S1_\theta S3_\theta}\right)}$$

s. Compute standard deviation of θ-based time bias:

$$\sigma_{bT\theta} = \sqrt{\frac{1}{S3_\theta}}$$

t. Compute goodness of fit for ρ:

$$\chi_\theta^2 = \sum \left(\frac{\Delta\theta_i - b_\theta - b_{T\theta}\theta_i}{(\sigma_{\Delta\theta})_i}\right)^2$$

u. Test for reasonableness:

If $Q\left(\frac{\chi_\theta^2}{2}, \frac{N-2}{2}\right) < \text{MIN\_P}$ discard the solution for θ, Q is the incomplete gamma function If $\frac{\sigma_{\theta\rho}}{\sigma_{\Delta\theta}/\sqrt{N}} > \text{MAX\_SIGMA}$ discard the solution for θ v. Test for significance:

If $\frac{b_\rho}{\sigma_{b\rho}} < \text{MIN\_AZI\_SIG}$ set $b_\theta = 0$ (no detection)

-continued

If $\frac{b_{T\rho}}{\sigma_{bT\rho}} <$ MIN_TIME_SIG set $b_{T\theta} = 0$ (no detection)

w. If there is a ρ-based time bias detection ($b_{T\rho}$>0) and there is a θ-based time bias detection ($b_{T\theta}$>0), set the time bias solution $$b_T = b_{T\rho} \text{ if } \frac{b_{T\rho}}{\sigma_{bT\rho}} > \frac{b_{T\theta}}{\sigma_{bT\theta}}$$

otherwise $b_T = b_{T\theta}$.

x. Publish solution: $b_\rho$, $b_\theta$ and $b_T$, and quality of solution $\chi^2$ (both ρ for and θ)

y. reset storage and counters:
   N_AZI_HI_P=0
   N_AZI_HI_N=0
   N_RHO_HI_P=0
   N_RHO_HI_N=0
   N=0

If the input target data is raw (not registration corrected) the computed correction bias parameters $b_\rho$, $b_\theta$ and $b_T$ are added to the raw azimuth and range to obtain the corrected values. If the input target data is registration corrected (using previously obtained correction parameters) then $b_\rho$, $b_\theta$ and $b_T$ provide adjustments to the currently used registration correction parameters. Use of unregistered inputs is preferred to avoid computational losses in bias calculation, however either method will work.

Working under realistic loads it is foreseen that a PR$^2$ solution will be available every few minutes. To reduce the statistical fluctuation of solutions it is advantageous to apply a run-to-run smoothing of the registration parameters:

$$b_\theta = b_{\theta p} + \alpha(b_{\theta n} - b_{\theta p}) \quad (1)$$

where,
   $b_\theta$=azimuth bias correction found in the previous run of the algorithm
   $b_{\theta n}$=azimuth bias correction found in the current run of the algorithm
   α=an appropriately chosen smoothing coefficient (<1) that controls the strength of smoothing (α=0 means discard current measurement—not a useful choice, α=1 means give maximum weight to current measurement)
and $$b_\rho = b_{\rho p} + \beta(b_{\rho n} - b_{\rho p}) \quad (2)$$

where,
   $b_{\rho p}$=range bias correction found in the previous run of the algorithm
   $b_{\rho n}$=range bias correction found in the current run of the algorithm
   β=an appropriately chosen smoothing coefficient (see α in azimuth smoothing)

3) Radar to Radar ADS-B-Based Correction Propagation

For radars for which it is not possible to collect a sufficiently large sample of targets from ADS-B equipped aircraft but that overlap with another radar that has undergone single radar ADS-B-based registration correction (see step 120), the PR$^2$ algorithm 100 may proceed as follows:

Data from the ADS-B-based corrected radar is used as the 'trusted' positional reference (albeit with larger uncertainty) in lieu of the ADS-B proper data, and the 'single radar' algorithm described in step 122 is applied using the targets from the ADS-B-based corrected radar data as 'ADS-B' data.

The standard deviations of the measured Δρ and Δθ are computed using the appropriate noise characteristics of the radar in question. To compensate for higher target noise the sample size should be incremented and the interpolation smoothing should be made more aggressive (velocity estimation depends on noisy targets). Note that the solution for the radar in question is still of good quality (better than the radar-pair 2R4E legacy algorithm) because it relies in the accurately corrected positions from the reference radar, the added noise can be made as small as possible (limited only by sample size constraints).

4) Quality Monitoring Function 124

After obtaining a solution, its quality is evaluated by computing the $\chi^2$ statistic or goodness of fit (as described in step 122). In this regard, the $\chi^2$ statistic estimates the solution quality 134 of the bias correction solution 132. The $\chi^2$ statistic is a measure of the residuals around the linear trend. If those residuals are consistent with noise (i.e. they follow a chi-squared distribution) then one can say that the derived registration correction parameters do explain the observed linear behavior, that is the observed deltas—Δρ and Δθ—and the corresponding velocities exhibit a linear correlation dependency. On the other hand, if there are data quality issues (outliers, excess noise, etc) or other non-linear effects driving registration response (such as site surveying errors, deteriorated performance of the radar motor, mechanical anomalies, antenna tilt, etc) then the measured $\chi^2$ will have a high numeric value that has a low probability of being a result of noise alone, thus indicating the presence of bad data or non-liner effects. This result on itself is an accurate diagnostics tool. The probability associated with the chi-squared statistic providing an indication of the strength of the deviation from non-linearity.

In the event of detecting a non-linearity, in some cases as noted below, the PR$^2$ bias computation 122 can be used to identify the source of non-linearity by looking at the variation of registration correction parameters as a function of azimuth. To perform this analysis, target data is grouped in azimuth bins (for example 12 bins of 30° each). For each azimuth bin the entire PR$^2$ processing is followed (step 122). A plot of the resulting registration correction parameters as a function of azimuth can be compared with distinct known signatures from various effects as follows:

Site surveying errors are manifested as sinusoidal variations in both range and azimuth registration correction parameters as a function of azimuth;
   Motor degradation exhibits an azimuth registration correction that varies with azimuth. Range registration parameters on the other hand do not vary with azimuth.

5) Non-Linear Effects Monitoring 126 (Generalized Least Squares Solution)

A generalized method to extract the amplitude of non-linear effects when the source has been identified may be implemented. A generalized least squares (LS) formalism for computation of non-liner registration bias effects can be stated as follows: Define a generalized chi-squared function $$\chi^2(\vec{b}) = \sum_i^n \left(\frac{\Delta\theta_i - f_\theta(\vec{b}; \rho_i, \theta_i)}{\sigma_\theta}\right)^2 + \left(\frac{\Delta\rho_i - f_\rho(\vec{b}; \rho_i, \theta_i)}{\sigma_\rho}\right)^2$$

Where,
   Δρ, Δθ=differences between radar reported and ADS-B time interpolated range and azimuth for each radar target (same as in step 2);

$\sigma_\rho$, $\sigma_\theta$=standard deviations of noise in range and azimuth (as in step 2);

$f_\rho$, $f_\theta$=functions that model non-linear effects. These non-linear model are parameterized with a set of coefficients (vector b).

The $f_\rho$, $f_\theta$ functions could be analytical expressions with the non-linearities explicitly stated or could be the result of data transformations where the effects in question are taken into account. For instance, the site surveying errors can be included in this analysis by applying an X,Y offset (these offsets being the only two coefficients in the vector b) to the adapted radar location as part of the computation of the deltas ($\Delta\rho$ and $\Delta\theta$). The $\chi^2$ function above is minimized (numerically) and the set of coefficients b that results in the minimum $\chi^2$ is the solution. The considerations on goodness of fit described in connection with step 134 also apply in the context of step 126.

Integration with Legacy Registration

Figure 2:
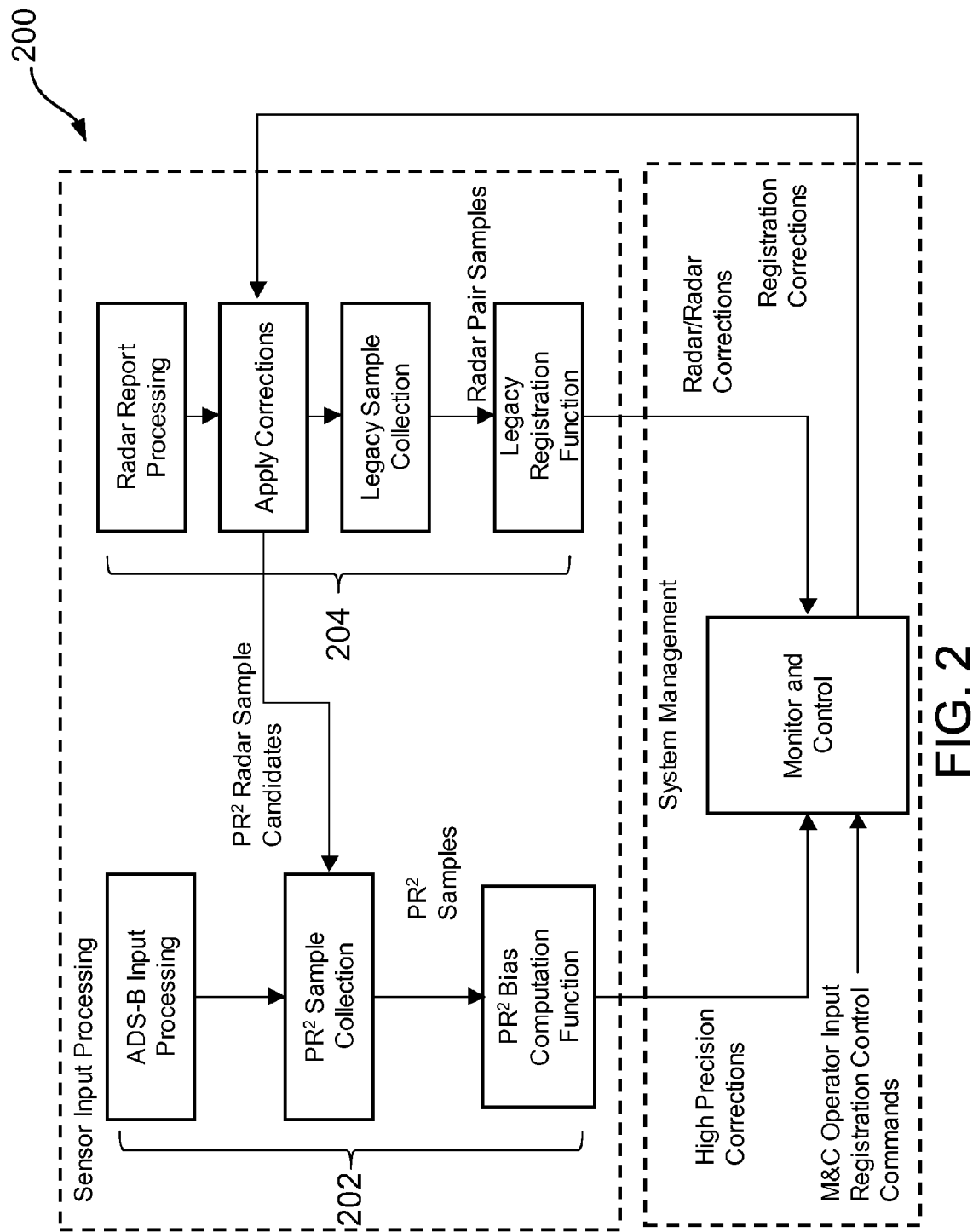
FIG. 2 provides an overview of one embodiment of a system implementing the PR² algorithm.

Integration of $PR^2$ with a legacy system is depicted in FIG. 2. The $PR^2$ algorithm 100 such as previously described provides registration bias corrections for radars that have ADS-B targets within their coverage area as well as overlapping radars that do not, if any exist. If desired, in a deployed configuration, the $PR^2$ algorithm 100 may operate in parallel with a legacy radar to radar registration algorithm. In this regard, an ATC system 200 may have $PR^2$ registration functions 202 implemented in parallel with legacy radar to radar functions 204 The two types of functions 202, 204 will execute independent of each other. It is expected that the $PR^2$ registration bias corrections will be used operationally (either automatically applied or with manual approval). In the event the $PR^2$ registration algorithm 100 fails to provide bias corrections, the corrections provided by the legacy function may be used. In addition, the corrections provided by the two algorithms may be compared and alarms triggered if there is a significant difference in the algorithm results.

$PR^2$ Operations Concept

Figure 3:
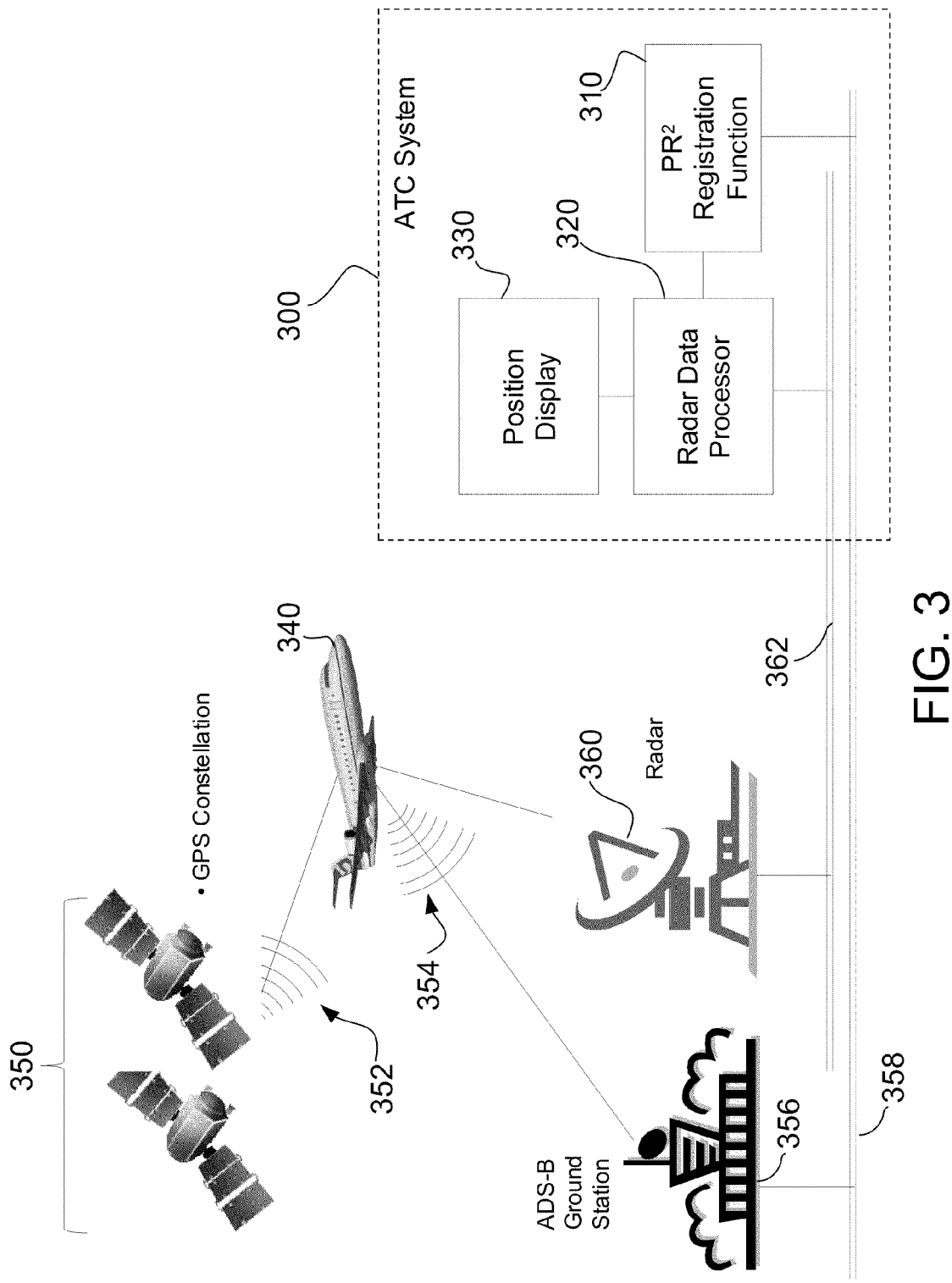
FIG. 3 is a diagrammatic representation of the PR² operations concept.

As illustrated in FIG. 3, the $PR^2$ algorithm 100 may be incorporated in the form of a $PR^2$ registration function 310 within an ATC system 300 that also includes radar data processor 320 and position display 330 features. In accordance with the $PR^2$ operations concept, an ADS-B equipped aircraft 340 receives GPS broadcast signals 352 from a GPS constellation 350, processes the GPS signals 352 onboard the aircraft 340 and transmits ADS-B information 354 to an ADS-B ground station 356 that is in communication with the ATC system 300. One or more radar sites 360 in communication with the ATC system 300 monitor the aircraft 340. The radar data processor 320 of the ATC system 300 processes the radar data 362 from the radar site(s) 360 and provides the processed data to the $PR^2$ registration function 310 which registers the radar site(s) 360 using the ADS-B positional data 354. The $PR^2$ registration function 310 outputs bias corrections for the radar site(s) 360 to the radar data processor 320. This capability allows the radar data processor 320 to provide registration corrected target reports for display by the position display of the ATC system 300.

Figure 4:
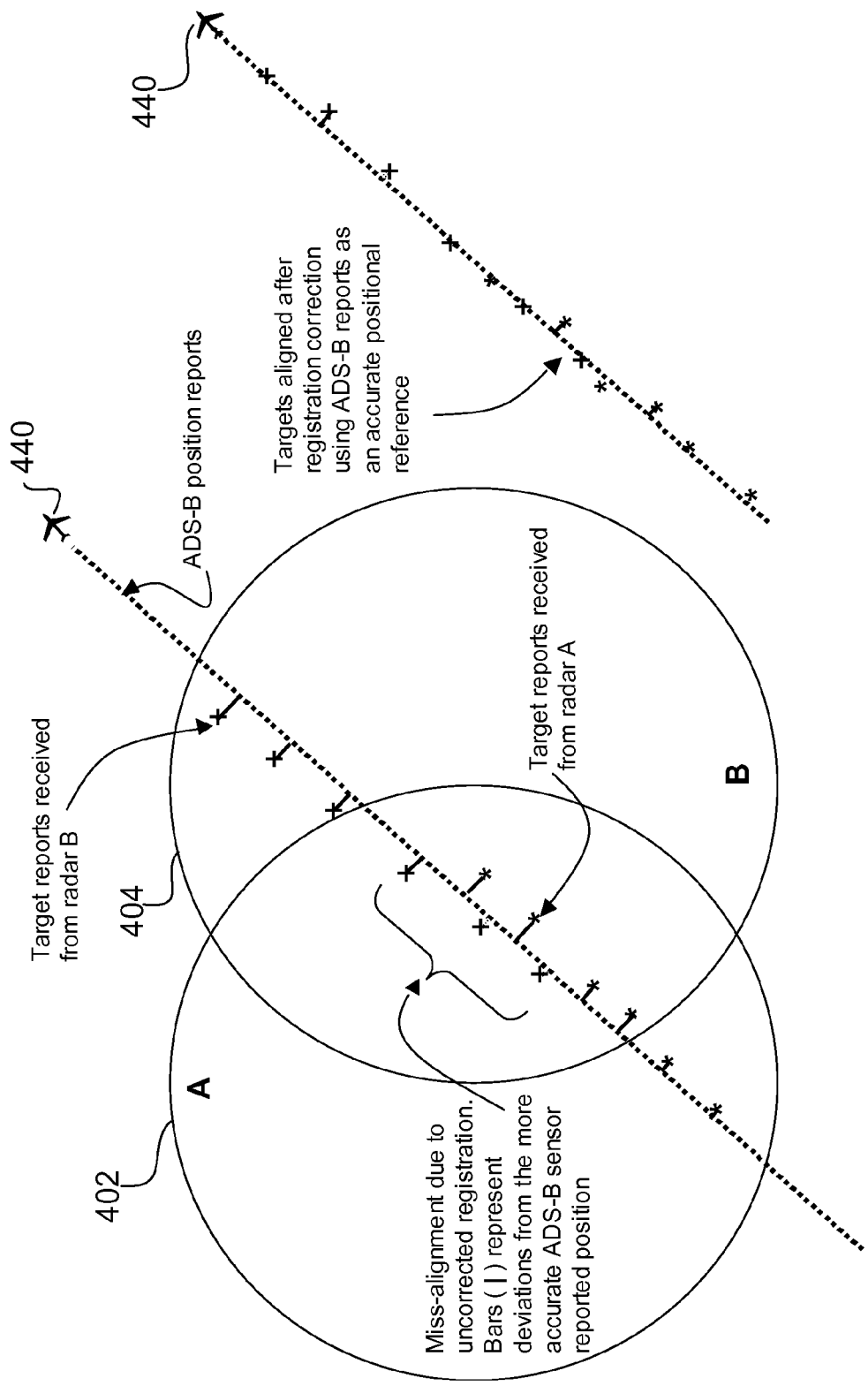
FIG. 4 depicts misaligned target reports from two overlapping radars before registration and alignment of the target reports after registration in accordance with the PR² algorithm.

An example of the alignment of target reports from two overlapping radars (radar A and radar B) is depicted in FIG. 4. On the left side of FIG. 4, the coverage area of radar A is represented by circle 402, and the coverage area of radar B is represented by circle 404. Target reports from radar A for an aircraft 440 moving through the coverage area 402 of radar A are represented by '*' symbols. Target reports from radar B for the aircraft 440 moving through the coverage area 404 of radar B are represented by 'x' symbols. ADS-B position reports for the aircraft are represented by the '■' symbols. As can be seen on the left side plot of FIG. 4, a number of the target reports from radars A and B may be misaligned due to uncorrected registration present in radars A and B. In this regard, '|' symbols represent the deviations from the more accurate ADS-B sensor reported positions for the aircraft 440. The right-hand side of FIG. 4 illustrates the improved alignment of the target reports from radars A and B with the ADS-B position reports from the aircraft 440 after registration correction using position bias and time bias parameters generated for radars A and B, respectively using the ADS-B reports as an accurate positional reference in accordance with the $PR^2$ algorithm 100 such as described herein.

While various embodiments of the present invention have been described in detail, further modifications and adaptations of the invention may occur to those skilled in the art. However, it is to be expressly understood that such modifications and adaptations are within the spirit and scope of the present invention.

What is claimed is:

1. A radar registration system comprising:
   a radar operable to output radar data including a plurality of radar-based position reports associated with one or more targets moving within a range of the radar;
   a geo-referenced position source operable to output a plurality of geo-referenced position reports associated with the one or more targets; and
   a processor operable to compute both position and time bias parameters associated with the radar by analyzing the radar-based position reports using the geo-referenced position reports as a reference.

2. The system of claim 1 wherein the processor executes a linear regression analysis to analyze the radar-based position reports using the geo-referenced position reports as a reference.

3. The system of claim 2 wherein the linear regression analysis is executed in a manner providing a single pass closed solution for the position and time bias parameters.

4. The system of claim 1 wherein the position bias parameters comprise a range bias and an azimuth bias that are orthogonal to one another and to the time bias.

5. The system of claim 1 wherein the processor is included within an air traffic control system.

6. The system of claim 1 wherein the processor operates in parallel with a legacy radar registration function.

7. The system of claim 1 wherein said processor is further operable to time align the plurality of radar-based position reports with the plurality of geo-referenced position reports without source dependency.

8. The system of claim 1 wherein said processor is further operable to perform quality monitoring during computation of the position and time bias parameters to provide an estimate of the quality of the position and time bias parameters.

9. The system of claim 1 wherein said processor is further operable to monitor non-linear effects present in the computation of the position and time bias parameters to detect a non-linear bias.

10. The system of claim 1 wherein the radar comprises a first radar, wherein the plurality of radar-based position reports comprise a first plurality radar-based position reports associated with one or more targets moving within a range of the first radar, and wherein said system further comprises:
    a second radar operable to output radar data including a second plurality of radar-based position reports associated with one or more targets moving within a range of said second radar, wherein the ranges of said first and second radars overlap;

said processor being further operable to compute position and time bias parameters associated with the second radar by analyzing the second plurality of radar-based position reports using the first plurality of radar-based position reports as a reference after registration of the first plurality of radar-based position reports in accordance with the position and time bias parameters associated with the first radar.

11. The system of claim 10 wherein the processor executes a linear regression analysis to analyze the second plurality of radar-based position reports using the registered first plurality of radar-based position reports as a reference.

12. A method of registering a radar, said method comprising:
collecting a plurality of radar data samples from the radar, the radar data samples comprising radar-based position reports associated with one or more targets moving within range of the radar;
collecting a plurality of geo-referenced data samples from a geo-referenced position source, the geo-referenced data samples comprising geo-referenced position reports associated with the one or more targets; and
computing both position and time bias parameters associated with the radar by analyzing the radar-based position reports using the geo-referenced position reports as a reference.

13. The method of claim 12 wherein said step of computing position and time bias parameters comprises:
executing a linear regression analysis to analyze the radar-based position reports using the geo-referenced position reports as a reference.

14. The method of claim 13 wherein the linear regression analysis is executed in a manner providing a single pass closed solution for the position and time bias parameters.

15. The method of claim 12 wherein in said step of computing position and time bias parameters, the position bias parameters comprise a range bias and an azimuth bias that are orthogonal to one another and to the time bias.

16. The method of claim 12 wherein said step of computing position and time bias parameters, computation of the position and time bias parameters occurs on a processor within an air traffic control system.

17. The method of claim 12 wherein said computing step is undertaken in parallel with a legacy radar registration function.

18. The method of claim 12 further comprising the step of:
time aligning the radar data samples with the geo-referenced data samples without source dependency.

19. The method of claim 12 further comprising the step of:
performing a quality monitoring during computation of the position and time bias parameters to provide an estimate of the quality of the position and time bias parameters.

20. The method of claim 12 further comprising the step of:
monitoring non-linear effects present in the computation of the position and time bias parameters to detect a non-linear bias.

21. The method of claim 12 wherein the radar comprises a first radar, wherein the radar data samples collected from the first radar comprise a first plurality of radar-based position reports associated with one or more targets moving within a range of the first radar, and wherein said method further comprises:
collecting a plurality of radar data samples from a second radar, the radar data samples collected from the second radar comprising a second plurality of radar-based position reports associated with one or more targets moving within a range of the second radar, wherein the ranges of the first and second radars overlap; and
computing position and time bias parameters associated with the second radar by analyzing the second plurality of radar-based position reports using the first plurality of radar-based position reports as a reference after registration of the first plurality of radar-based position reports in accordance with the position and time bias parameters associated with the first radar.

22. The method of claim 21 wherein said step of computing position and time bias parameters associated with the second radar comprises:
executing a linear regression analysis to analyze the second plurality of radar-based position reports using the registered first plurality of radar-based position reports as a reference.

* * * * *